US012654603B2

(12) United States Patent
Zeng et al.

(10) Patent No.: US 12,654,603 B2
(45) Date of Patent: Jun. 16, 2026

(54) CHILD SAFETY SEAT, AND SUPPORTING ASSEMBLY THEREOF

(71) Applicant: Bambino Prezioso Switzerland AG, Steinhausen (CH)

(72) Inventors: Xiangyong Zeng, Steinhausen (CH); Zhengwen Guo, Steinhausen (CH)

(73) Assignee: Bambino Prezioso Switzerland AG, Steinhausen (CH)

( * ) Notice: Subject to any disclaimer, the term of this patent is extended or adjusted under 35 U.S.C. 154(b) by 74 days.

(21) Appl. No.: 18/558,927

(22) PCT Filed: May 6, 2022

(86) PCT No.: PCT/EP2022/062348
§ 371 (c)(1),
(2) Date: Nov. 3, 2023

(87) PCT Pub. No.: WO2022/234121
PCT Pub. Date: Nov. 10, 2022

(65) Prior Publication Data
US 2024/0227639 A1 Jul. 11, 2024

(30) Foreign Application Priority Data

May 6, 2021 (CN) .......................... 202110491918.0

(51) Int. Cl.
*B60N 2/28* (2006.01)
(52) U.S. Cl.
CPC ............. *B60N 2/2893* (2013.01); *B60N 2/28* (2013.01); *B60N 2/2824* (2013.01)
(58) Field of Classification Search
CPC ....... B60N 2/28; B60N 2/2824; B60N 2/2893
See application file for complete search history.

(56) References Cited

U.S. PATENT DOCUMENTS 5,383,708 A    1/1995   Nagasaka et al.
9,173,492 B1   11/2015  Fortin
(Continued)

FOREIGN PATENT DOCUMENTS

CN    201264544 Y    7/2009
CN    104276060 A  *  1/2015   ........... B60N 2/2893
(Continued)

OTHER PUBLICATIONS

Notice of Allowance issued in corresponding Chinese Application No. 202110491918.0 dated Dec. 29, 2023. English translation included.

(Continued)

*Primary Examiner* — Anthony D Barfield
(74) *Attorney, Agent, or Firm* — Volpe Koenig

(57) ABSTRACT

Disclosed are a child safety seat and a supporting assembly of the child safety seat. The supporting assembly of the child safety seat provided by the application includes: a base; a rebound bracket, including a pivotable arm, and a first crossbeam disposed at an upper end of the pivotable arm, a lower end of the pivotable arm being pivotally connected to the base; a locking mechanism, arranged on the base; a tensioning belt, a first end of the tensioning belt being connected to the base, a second end of the tensioning belt functioning as a pulling end, a middle portion of the tensioning belt being configured to pass through the first crossbeam and the locking mechanism. The second end of the tensioning belt is configured to pass through the first crossbeam first, and then the locking mechanism, and the locking mechanism is configured to lock the tensioning belt.

20 Claims, 9 Drawing Sheets

(56) References Cited

U.S. PATENT DOCUMENTS

| | | | |
|---|---|---|---|
| 9,963,051 | B2 | 5/2018 | Strong et al. |
| 2001/0004163 | A1* | 6/2001 | Yamazaki .............. B60N 2/286 |
| | | | 297/256.16 |
| 2012/0181828 | A1 | 7/2012 | Cheng |
| 2015/0183341 | A1* | 7/2015 | Carpenter ............ B60N 2/2821 |
| | | | 297/256.16 |
| 2015/0336481 | A1 | 11/2015 | Horsfall |
| 2017/0210254 | A1 | 7/2017 | Mitchell et al. |
| 2019/0217751 | A1 | 7/2019 | Kaiser |
| 2019/0255975 | A1* | 8/2019 | Longenecker ....... B60N 2/2893 |

FOREIGN PATENT DOCUMENTS

| | | | |
|---|---|---|---|
| CN | 107089173 | A | 8/2017 |
| CN | 209208547 | U | 8/2019 |
| CN | 110682837 | A | 1/2020 |
| CN | 111770855 | A | 10/2020 |
| CN | 111845481 | A | 10/2020 |
| CN | 112078449 | A | 12/2020 |
| DE | 202004017276 | U1 | 2/2005 |
| EP | 1623892 | A1 | 2/2006 |
| EP | 3511202 | A1 | 7/2019 |
| EP | 3689672 | A1 | 8/2020 |
| JP | H10119611 | A | 5/1998 |
| JP | 2000280800 | A | 10/2000 |
| JP | 2013014322 | A | 1/2013 |
| JP | 2015189296 | A | 11/2015 |
| WO | 2021098710 | A1 | 5/2021 |

OTHER PUBLICATIONS

Shengnan "On the Design of Child Car Seats" Changchun Institute of technology, Changchun 130000, China, 2016. English translation of Abstract included.

You, et al. "Design of Foldable Infant Bus Seats" College of transportation Science and Engineering, Jilin Jianzhu University, Changchun, 130118, China, 2017. English translation of Abstract included.

International Search Report and Written Opinion for PCT/EP2022/062348 dated Sep. 5, 2022.

Office Action for corresponding Taiwanese Application No. 111117199 dated Sep. 7, 2023. English translation included.

Japan Patent Office. Office Action for corresponding application JP 2023-568312, mailed Dec. 10, 2024. English translation included.

* cited by examiner

4

CHILD SAFETY SEAT, AND SUPPORTING ASSEMBLY THEREOF

CROSS-REFERENCE TO RELATED APPLICATIONS

This application is a U.S. National Stage of International Application No PCT/EP2022/062348, filed on May 6, 2022, which claims the priority of Chinese patent application 202110491918.0, filed on May 6, 2021, and entitled "CHILD SAFETY SEAT, AND SUPPORTING ASSEMBLY THEREOF", the entire contents of which are incorporated herein by reference.

TECHNICAL FIELD

The present application relates to the field of child safety seats, and more particularly, to a child safety seat and a supporting assembly thereof.

BACKGROUND

The child safety seat is usually configured to be installed on a vehicle seat to provide safety guarantee for travel of infants and young children. The child safety seat includes a seat body and a supporting assembly. The seat body provides a restraint system for the seated infants and young children, and the supporting assembly is configured to firmly and reliably fix the seat body to the vehicle seat, to prevent the seat body from tipping over or sliding relative to the vehicle seat.

FIG. 1 shows a side view of a typical supporting assembly of a child safety seat (hereinafter referred to as the supporting assembly). The supporting assembly includes a base 1', a rebound bracket 2', and a load leg 5'. The base 1' is configured to be arranged on the seat body of the vehicle seat, and a rear end of the base 1' is provided with an ISOFIX plug 9' configured to be locked in an ISOFIX socket on the vehicle seat. The rebound bracket 2' is also called a rebound bar and a lower end of the rebound bracket 2' is fixedly attached to the base 1' and is inclined relative to the base 1'. The rebound bracket 2' is configured to press against the backrest of the vehicle seat. The load leg 5' is arranged at a front end of the base 1', and is configured to be supported on the floor of the vehicle. The rebound bracket 2', cooperating with the load leg 5', prevents the base from tipping over when the vehicle is suddenly braked due to an accident, thereby preventing the seat body installed on the base 1' from tipping over.

When the supporting assembly of the child safety seat is in use, the child safety seat fully plays a protective role when the rebound bracket 2' presses against the backrest of the vehicle seat tightly and the load leg 5' presses against the floor of the vehicle tightly. Because types of vehicles are various, and internal designs of various vehicles are extremely different, in order to ensure that the supporting assembly of the child safety seat can be applicable to various types of vehicles, the load leg 5' is configured to be a multi-section retractable load leg in the related art. The tight pressing effects of the rebound bracket 2' pressing against the seat back and the load leg 5' pressing against the floor of the vehicle is adjusted by adjusting a height of the load leg 5'.

SUMMARY

The application intends to provide a supporting assembly of a child safety seat, to improve adaptability of the supporting assembly of the child safety seat to various types of vehicles.

In one aspect, the application provides a supporting assembly of a child safety seat, including: a base, a rebound bracket, a locking mechanism, and a tensioning belt. The rebound bracket includes a pivotable arm, and a first cross-beam disposed at an upper end of the pivotable arm. A lower end of the pivotable arm is pivotally connected to the base. The locking mechanism is arranged on the base. A first end of the tensioning belt is connected to the base, a second end of the tensioning belt functions as a pulling end, and a middle portion of the tensioning belt is configured to pass through the first crossbeam and the locking mechanism. The second end of the tensioning belt is configured to pass through the first crossbeam first, and then the locking mechanism, and the locking mechanism is configured to lock the tensioning belt.

In another aspect, the application provides a supporting assembly of a child safety seat, including: a base, a rebound bracket, a locking mechanism, and a tensioning belt. A rebound bracket includes a pivotable arm, and a first cross-beam disposed at an upper end of the pivotable arm, and a lower end of the pivotable arm is pivotally connected to the base. The locking mechanism is arranged on the first cross-beam. A first end of the tensioning belt is connected to the base, a middle portion of the tensioning belt is configured to pass through the locking mechanism, a second end of tensioning belt functions as a pulling end. The locking mechanism is configured to lock the tensioning belt.

In some embodiments, the second end of the tensioning belt is configured to go through the bottom of the base and to extend towards a front of the base.

In some embodiments, the locking mechanism includes a locking channel and a locking member, the middle portion of the tensioning belt is configured to pass through the locking channel, and the locking member is configured to press the tensioning belt against a channel wall of the locking channel.

In some embodiments, the locking mechanism further includes a mounting housing, and the locking channel is formed in the mounting housing. The locking member is pivotally connected to the mounting housing by a first pin shaft. A first end of the locking member is configured to press the tensioning belt against the channel wall of the locking channel, a second end of the locking member is configured to bear a force to drive the locking member to rotate around the first pin shaft, to release the tensioning belt from being pressed by the first end of the locking member.

In some embodiments, the first end of the locking member includes a cam.

In some embodiments, the locking mechanism further includes a first torsion spring sleeving the first pin shaft, and two ends of the first torsion spring are connected to the locking member and the mounting housing, respectively.

In some embodiments, the locking mechanism further includes a button, pivotally connected to the mounting housing by a second pin shaft and at least partially covering the locking member, and the button has a pressing portion corresponding to the second end of the locking member.

In some embodiments, the first end of the locking member has a curved surface configured to press against the tensioning belt.

In some embodiments, a ratchet structure is disposed on the curved surface.

In some embodiments, an elastic member is arranged between the base and the rebound bracket, and the elastic member is configured to exert a force on the rebound bracket to keep the rebound bracket away from the base or to keep the rebound bracket close to the base.

In some embodiments, the elastic member is a spring, and two ends of the spring are connected to the base and the rebound bracket, respectively. Or the elastic member is a second torsion spring, a lower end of the rebound bracket is pivotally connected to the base by a third pin shaft. The second torsion spring sleeves the third pin shaft, and two ends of the second torsion spring are connected to the base and the rebound bracket, respectively.

In another aspect, the application provides a child safety seat, provided with the supporting assembly of the child safety seat above.

When the supporting assembly of the child safety seat provided by the present application is installed on the vehicle seat and needs to be tightened, by operating the tensioning belt and the load leg, the rebound bracket can easily press against the backrest of the vehicle seat tightly, and the lower end of the load leg presses the floor in the vehicle, so that the supporting assembly can reliably engage with the vehicle seats of various types of vehicles, and a relative movement therebetween will not occur easily. The supporting assembly of the child safety seat provided by the present application has high universality.

DETAILED DESCRIPTION OF THE EMBODIMENTS

Figure 1:
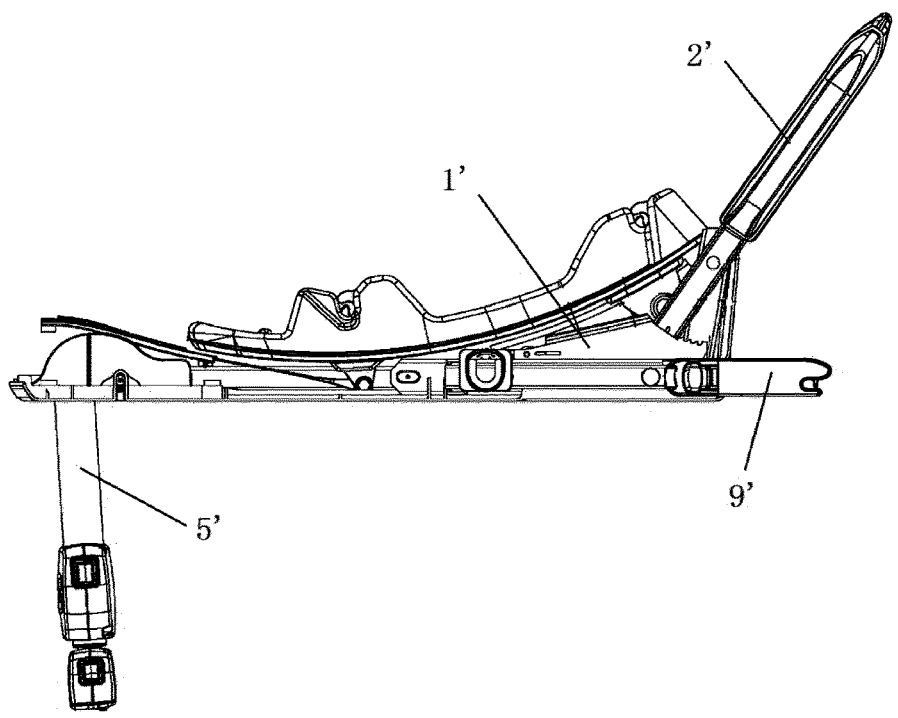
FIG. 1 schematically shows a side view of a supporting assembly of a child safety seat in the related art.

However, there is stage difference in the height adjustment of the multi-section retractable supporting leg, and when the child safety seat provided with the multi-section retractable supporting leg is applied to some vehicles, it is difficult to take into account both the tight pressing effect of the upper leaning bracket and the tight pressing effect of the supporting leg at the same time.

FIGS. 2 through 6 schematically show a structure of a supporting assembly 100 of a child safety seat according to an embodiment of the present application. The supporting assembly 100 of the child safety seat (hereinafter also referred to as the supporting assembly 100 for short) includes a base 1, a rebound bracket 2, a tensioning belt 3, a locking mechanism 4, and a load leg 5.

Figure 2:
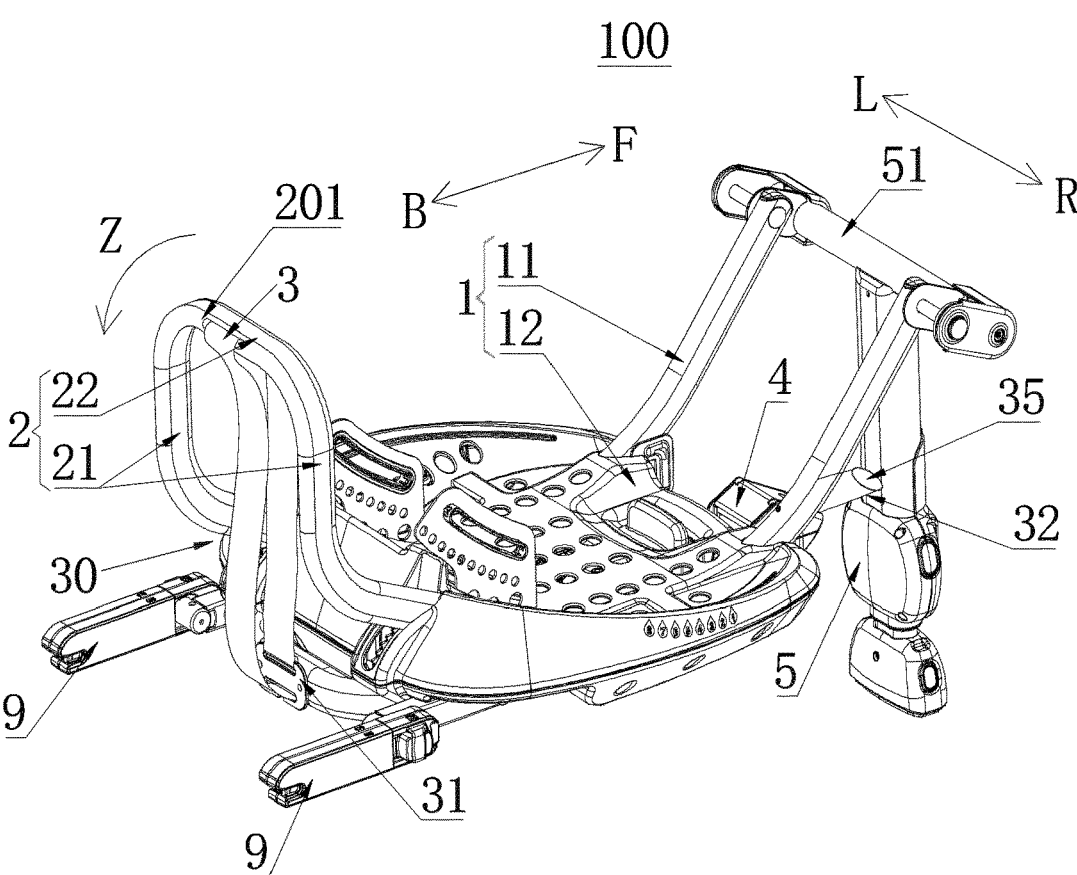
FIG. 2 schematically shows a perspective view of the supporting assembly of the child safety seat according to an embodiment of the present application.
Figure 3:
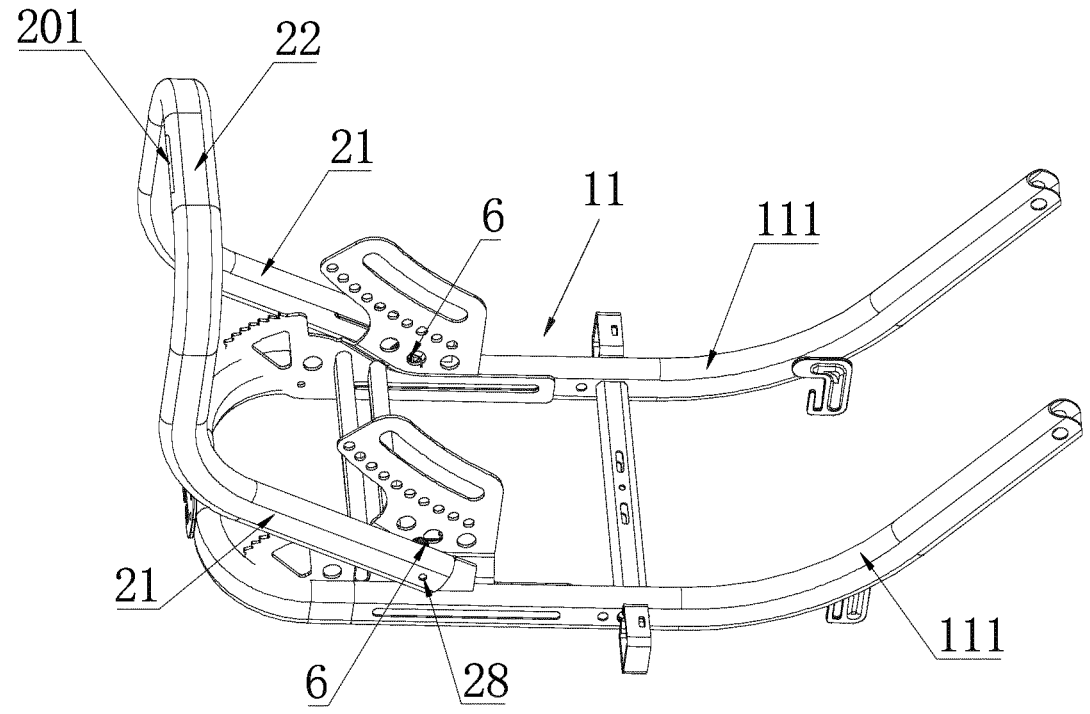
FIG. 3 schematically shows a perspective view of a base frame and a rebound bracket of the supporting assembly of the child safety seat according to the embodiment of the present application.
Figure 4:
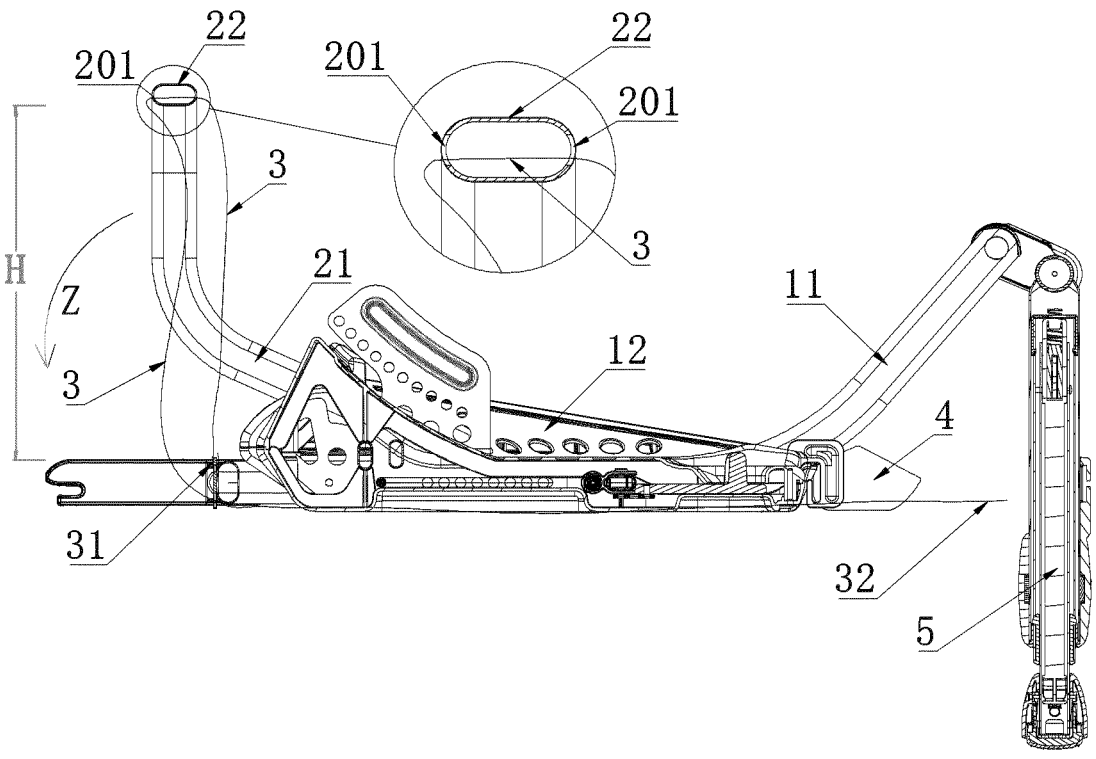
FIG. 4 schematically shows a longitudinal sectional view of the supporting assembly of the child safety seat according to the embodiment of the present application.

Referring to FIGS. 2 through 4, in some embodiments, the base 1 includes a base frame 11, and a base body 12 arranged on the base frame 11. The base frame 11 includes two longitudinal beams 111 arranged at intervals along the left and right directions of the vehicle, and each longitudinal beam 111 is approximately linear or is in any other suitable shape. In this embodiment, front ends of the two longitudinal beams 111 are respectively bent upwards, and rear ends of the two longitudinal beams 111 are joined together to form a U-shaped structure. The base body 12 is arranged on the two longitudinal beams 111 and configured to be installed together with a seat body (not shown) of the child safety seat. It may be understood that the structure of the base 1 may also have other implementations.

It should be noted that, unless otherwise expressly specified and limited, the orientation terms such as "front", "rear", "left", "right", "upper" and "lower" in this embodiment correspond to the "front" "rear", "left", "right", "upper", and "lower" directions of the vehicle. The "front" "rear", "left", "right" directions are schematically illustrated by arrows F, B, L, and R in figures. The orientation terms are only used to make the description of the embodiments of the present application clearer, but are not intended to improperly limit the protection scope of the present application.

The rebound bracket 2 and the load leg 5 are connected to the base 1 respectively. According to the relevant technology, it may be known that, the base 1 is configured to be arranged on the seat body of the vehicle seat (not shown in the figures), and the rear end of the base body 12 of the base 1 is provided with an ISOFIX plug 9. The ISOFIX plug 9 is configured to be locked in an ISOFIX socket of the vehicle seat. The rebound bracket 2 is configured to press against the backrest of the vehicle seat, and the load leg 5 is configured to be supported on the floor of the vehicle. In this embodiment, the rebound bracket 2 is, for example, a U-shaped rebound bar, which includes two pivotable arms 21, and a first crossbeam 22 disposed at upper ends of the two pivotable arms 21. Lower ends of the two pivotable arms 21, for example, are pivotally connected to rear positions of middle sections of the base frame 11 of the base 1 by a third pin shaft 28 respectively. When the supporting assembly 100 is in normal use, the pivotable arms 21 each are inclined relative to the base 1. It should be noted that, in this embodiment, the leaning bracket 2 includes the two pivot-able arms 21, and the first crossbeam 22 is connected between the upper ends of the two pivoting arms 21, but it may be understood that, in some alternative embodiments, the leaning bracket 2, for example, includes one pivot arm, and the pivot arm, for example, is located on a longitudinal center surface of the base frame 11. In this case, the first crossbeam 22 and the pivot arm, for example, are arranged to be in a T shape. The load leg 5 is configured to be supported on the floor of the vehicle. The upper end of the load leg 5 includes a second crossbeam 51, and two ends of the second crossbeam 51 are pivotally connected to front ends of the base frame 11, more specifically, to front ends of two longitudinal beams 111.

The tensioning belt 3 is, for example, a fabric belt or any other suitable belt. A first end 31 of the tensioning belt 3 is connected to the base 1, and a second end 32 of the tensioning belt 3 is, for example, a pulling end. A middle portion 30 of the tensioning belt 3, namely a portion of the tensioning belt 3 located between the first end 31 and the second end 32, passes through and more specifically is wrapped around the first crossbeam 22. It may be understood that the middle portion 30 of the tensioning belt 3 is connected with the rebound bracket 2 by means of the first crossbeam 22, and the tensioning belt 3 may exert effect on the rebound bracket 2 by means of its own tension. In some embodiments, the second end of the tensioning belt 3 is a free end. In some embodiments, the second end 32 of the tensioning belt 3 includes a pull ring 35, and a user may pull the tensioning belt 3 by means of the pull ring 35.

Referring to FIGS. 2 through 4, when the supporting assembly 100 of the child safety seat is in use, that is, when the base 1 is placed on the seat body of the vehicle seat to support the child safety seat, and when the rebound bracket 2 presses against the backrest of the vehicle seat, the user pulls the second end 32 of the tensioning belt 3, and the tensioning belt 3, while being tensioned, exerts a pressure on the rebound bracket 2, to enable the rebound bracket 2 to pivot towards the base 1 in a direction shown by an arrow Z, thereby pressing tightly against the backrest of the vehicle seat.

In this embodiment, the middle portion 30 of the tension-ing belt 3, by means of being wrapped around the middle portion of the first crossbeam 22, is slidably connected with the first crossbeam 22, which is beneficial to a balanced force exerted on the rebound bracket 2 when the tensioning belt 3 is tensioned. Of course, in other embodiments, the middle portion 30 of the tensioning belt 3 is wrapped around, for example, any other crossbeam structure arranged at an upper position of either pivotable arm 21, and thus is relatively slidably connected with the pivotable arm 21. In this case, when the tensioning belt 3 is pulled, the tensioning belt 3 may also drive the rebound bracket 2 to pivot toward the base 1 against a support force of the backrest, so that the rebound bracket 2 can tightly press against the backrest of the vehicle seat.

As may be seen from FIG. 4, a locking mechanism 4 is installed on a proper location on the base 1. The locking mechanism 4 is configured to connect with the tensioning belt 3, to allow the tensioning belt 3 to remain in a state of exerting the aforementioned pressure on the rebound bracket 2. According to the above description, it may be known that when the supporting assembly 100 is in use, the pivoting of the rebound bracket 2 towards the base 1 is restricted by the backrest of the vehicle seat. After the user pulls the second end 32 of the tensioning belt 3 to make the rebound bracket 2 press against the backrest of the vehicle seat tightly, the locking mechanism 4 is configured to prevent a relative movement between the tensioning belt 3 and the locking mechanism 4, such that the portion of the tensioning belt 3, which is between the first end 31 of the tensioning belt 3 and the locking mechanism 4, is kept in a tensioned state. That is, under the action of the tensioning belt 3 and the locking mechanism 4, a vertical distance H between the first cross-beam 22 and the first end 31 of the tensioning belt 3 remains an approximately fixed value. In this case, even if the user loosens the second end 32 of the tensioning belt 3, the tensioning belt 3 may still remain the state of exerting the aforementioned pressure on the rebound bracket 2, and the rebound bracket 2 is kept pressing tightly against the back-rest of the vehicle seat.

Referring to FIG. 4, in this embodiment, the locking mechanism 4 is disposed, for example, at a front end of the base body 12 of the base 1, and is disposed downstream from the first crossbeam 22 in a path direction from the first end 31 to the second end 32 of the tensioning belt 3. The middle portion 30 of the tensioning belt 3 passes through the locking mechanism 4 through the bottom of the base 1, to allow the second end 32 of the tensioning belt 3, when being pulled, to extend towards the front of the base 1. In this way, when the rebound bracket 2 needs to be pressed against the backrest of the vehicle seat tightly, the user may easily pull the second end 32 of the tensioning belt 3 from the front of the base 1 and operate the locking mechanism 4, so that the rebound bracket 2, under the pressure of the tensioning belt 3, presses against the backrest of the vehicle seat. Referring to FIG. 4, it may be understood that, in the path direction from the first end 31 to the second end 32 of the tensioning belt 3, the first end 31 of the tensioning belt 3 is disposed upstream from the first crossbeam 22, and the second end 32 of the tensioning belt 3 is disposed downstream from the locking mechanism 4. In the process of installing the ten-sioning belt 3, if the first end 31 of the tensioning belt 3 is connected to the base 1, then the second end 32 of the tensioning belt 3 may pass through the first crossbeam 22 and the locking mechanism 4 in order, thus completing the installment of the tensioning belt 3.

In some embodiments, in order to ensure that the middle portion 30 of the tensioning belt 3 is reliably wrapped around the first crossbeam 22, and, when being tensioned, will not move laterally along the first crossbeam 22, the rebound bracket 2 includes a guiding channel 201 which allows the middle portion 30 of the tensioning belt 3 to pass. Referring to FIG. 2, the guiding channel 201 is formed, for example, by a through hole disposed in the crossbeam 22. In some embodiments not shown, the guiding channel 201 is formed, for example, by a slot disposed in the first cross-beam 22, or the guiding channel 201 is formed, for example, by an accessory arranged on the first crossbeam 22, or the guiding channel 201 is formed, for example, between the first crossbeam 22 and an accessory arranged on the first crossbeam 22.

Figure 5:
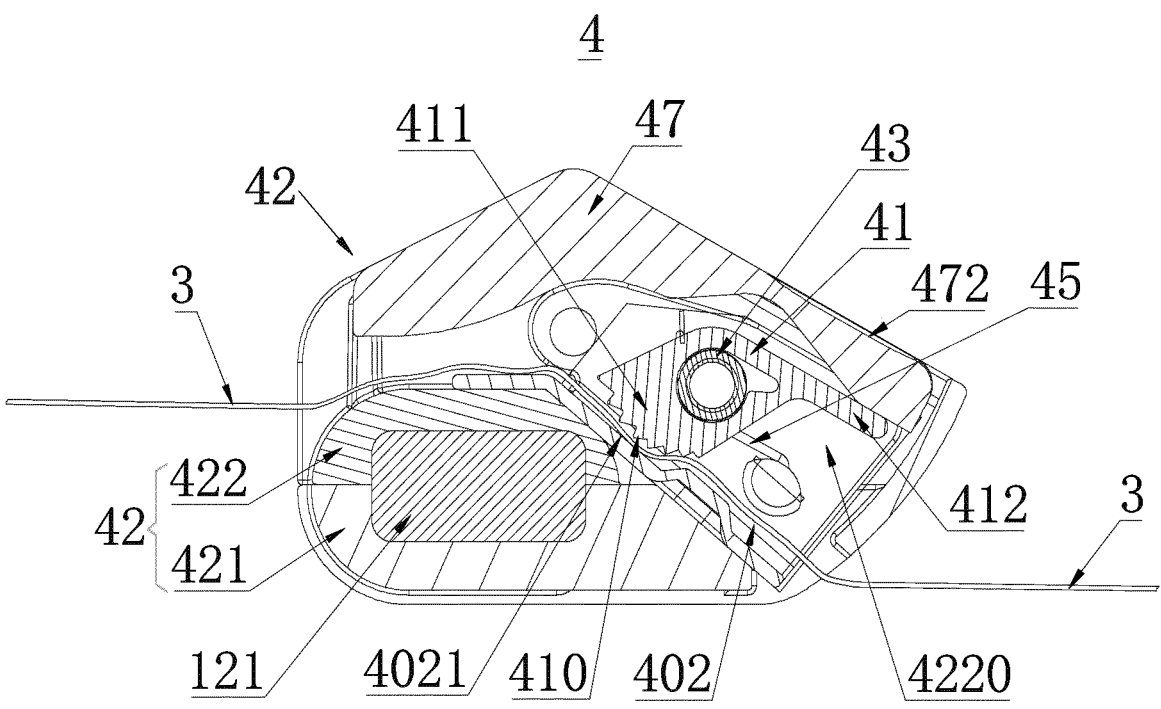
FIG. 5 schematically shows a longitudinal sectional view of a locking mechanism of the supporting assembly of the child safety seat according to the embodiment of the present application.
Figure 6:
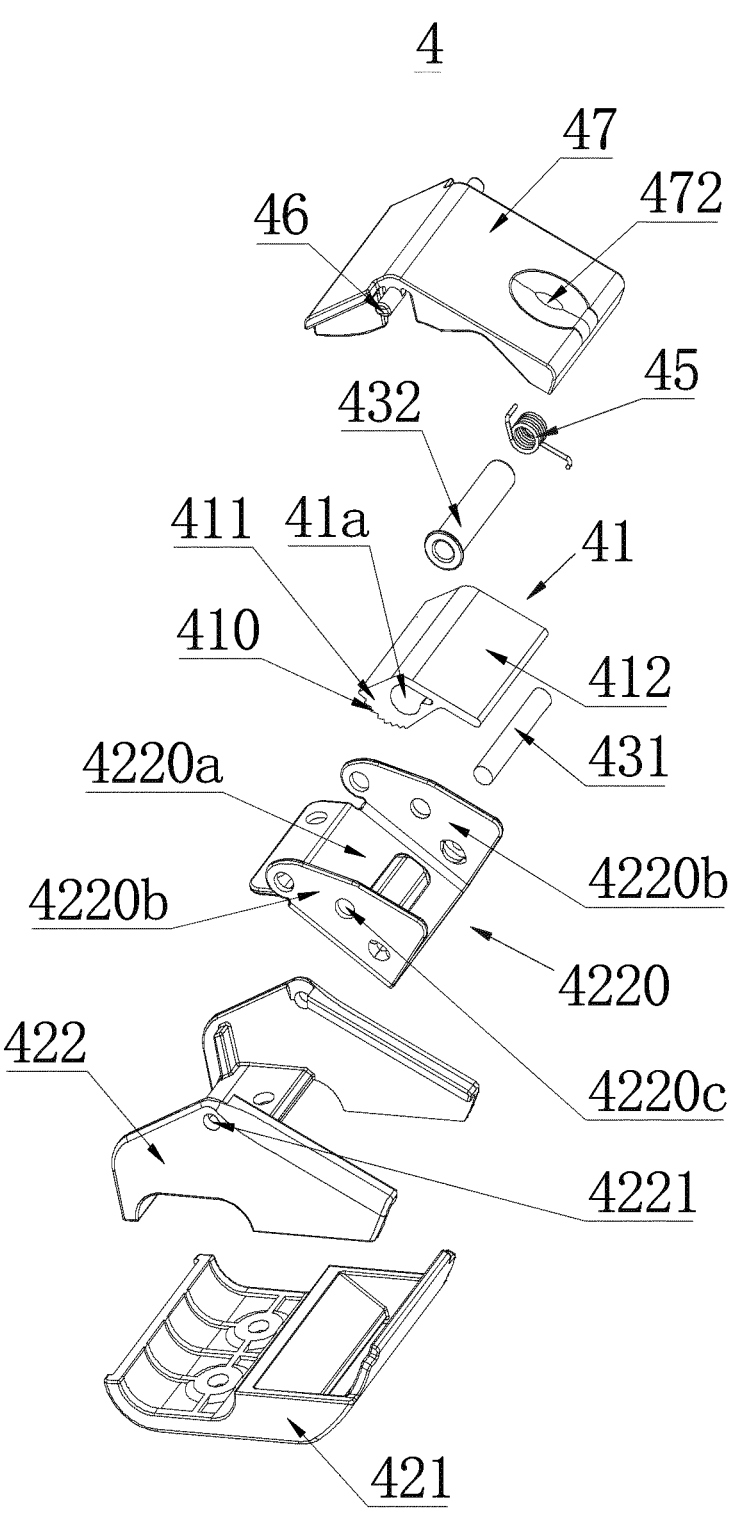
FIG. 6 schematically shows an exploded view of the locking mechanism of the supporting assembly of the child safety seat according to the embodiment of the present application.

Referring to FIGS. 5 and 6, an exemplary embodiment of the locking mechanism 4 is shown. The locking mechanism 4 includes a locking member 41 and a locking channel 402. The middle portion 30 of the tensioning belt 3 passes through the locking channel 402, and the locking member 41 is configured to press the tensioning belt 3 against a channel wall 4021 of the locking channel 402, so that the portion of the tensioning belt 3, which is between the first end 31 and the locking mechanism 4, is tensioned. It may be understood that, the locking member 41 is in a locking state or an unlocking state. When the locking member 41 is in the locking state, the locking member 41 presses the tensioning belt 3 against the channel wall 4021, that is, the tensioning belt 3 is clamped between the locking member 41 and the channel wall 4021. In this case, when the tensioning belt 3 is pulled, the tensioning belt 3 is protected from moving relative to the locking mechanism 4. When the locking member 41 is in the unlocking state, the tensioning belt 3 is released from being pressed by the locking member 41, and the tensioning belt 3 is wholly in a relaxed state and is allowed to move relative to the locking mechanism 4.

In some embodiments, a surface of the locking member 41, which is in contact with the tensioning belt 3, includes a first protruding part, and/or a surface of the channel wall 4021, which is in contact with the tensioning belt 3, includes a second protruding part (not shown in the figures). The first protruding part and the second protruding part are, for example, protrusions, teeth or other structures. When the locking member 41 presses the tensioning belt 3 against the channel wall 4021, the first protruding part and the second protruding part engage with the tensioning belt 3 by means of concave and convex cooperation, thereby increasing the resistance to the movement of the tensioning belt 3, and further preventing the tensioning belt 3 from moving relative to the locking mechanism 4 when the locking member 41 is in the locking state.

Referring to FIG. 5, the locking mechanism 4 includes a mounting housing 42, through which the locking mechanism 4 is mounted on a fixed position, more specifically, on the base 1. The locking channel 402 is formed in the mounting housing 42. The tensioning belt 3 enters the mounting housing 42 from one end of the locking channel 402 and leaves the mounting housing 42 from the other end of the locking channel 402. The locking member 41 is arranged on the mounting housing 42. For example, the middle portion of the locking member 41 is pivotally connected to the mounting housing 42 by the first pin shaft 43. The first end 411 of the locking member 41 functions as a locking end to press the tensioning belt 3 against the channel wall 4021 of the locking channel 402, and the second end 412 of the locking member 41 functions as an operating end to enable the locking member 41 to rotate around the first pin shaft 43, thereby releasing the tensioning belt 3 from being pressed by the first end 411 of the locking member 41.

An exemplary implementation of the mounting housing 42 is shown in this embodiment. The mounting housing 42 includes, for example, a first housing 421 and a second housing 422. The first housing 421 and the second housing 422 are engaged and are fixed to a rib 121 of the base body 12, for example, by means of a fastener. The locking member 41 is arranged, for example, on the second housing 422, and the locking channel 402 is formed, for example, in the second housing 422.

Referring to FIG. 6, in some embodiments, the second housing 422 further includes, for example, a support 4220. The support 4220 is made of, for example, a metal material (e.g., iron, or stainless steel), and is fixed, by a fastener, on the body of the second housing 422 made of, for example, a plastic material. The support 4220 includes, for example, a bottom wall 4220a, and two side walls 4220b located on opposite sides of the bottom wall 4220a. The first pin shaft 43 includes a sleeve 432, and a core shaft 431 sleeved by the sleeve 432. The locking member 41 has a through hole 41a configured to be pivotally connected with the sleeve 432. The side wall 4220b has a through hole 4220c configured to be pivotally connected with the core shaft 431. At least part of the channel wall of the locking channel 402 is formed on the inner surface of the bottom wall 4220a, and the first end 411 of the locking member 41 is configured, for example, to press the tensioning belt 3 against the bottom wall 4220a. It may be understood that, in other embodiments, the mounting housing 42 has other implementations, which are not limited to the above examples.

Referring to FIG. 5 and FIG. 6, in this embodiment, the locking mechanism 4 further includes a first torsion spring 45 sleeving the first pin shaft 43. Two ends of the first torsion spring 45 are connected to the locking member 41 and the mounting housing 42, for example, the support 4220 of the mounting housing 42, respectively. The first torsion spring 45 is configured to keep the locking member 41 in the locking state. When the tensioning belt 3 needs to be loosened, the second end 412 of the locking member 41 is pressed to get the locking member 41 to pivot around the first pin shaft 43 against the elastic force of the first torsion spring 45, that is, the first end 411 of the locking member 41 is forced to lift up from the tensioning belt 3, and the locking member 41 is switched to the unlocking state.

In some embodiments, the first end 411 of the locking member 41 has a curved surface for pressing the tensioning belt 3, and the curved surface includes protruding teeth 410 formed thereon. The protruding teeth 410 are configured to press the tensioning belt 3 against the bottom wall 4220a, which can effectively prevent the tensioning belt 3 from moving. In some embodiments, the protruding teeth 410 on the curved surface are configured to have a ratchet structure. In this case, when the locking member 41 is in the locking state, the tensioning belt 3 may move forwards relative to the locking mechanism 4 when the second end 32 of the tensioning belt 3 is pulled, so that the rebound bracket 2 may further press against the backrest. When the locking member 41 is in the locking state, the ratchet structure prevents the tensioning belt 3 from moving backwards relative to the locking mechanism 4, thereby preventing the tensioned portion of the tensioning belt 3 from loosening.

Referring to FIGS. 5 and 6, in some embodiments, the locking mechanism 4 further includes a button 47 pivotally connected to the mounting housing 42 by a second pin shaft 46. For example, the second housing 422 is provided with a hole 4221 for mounting the second pin shaft 46. The button 47, for example, at least partially, covers the locking member 41, and the button 47 has a pressing portion 472 corresponding to the second end 412 of the locking member 41. The user may easily switch the locking member 41 to the unlocking state by pressing the pressing portion 472.

In an embodiment, the first end of the locking member 41 is a cam, such that the user may operate the second end 412 of the locking member 41 via the shape feature of the cam, to enable the locking member 41 to pivot around the first pin shaft 43, thereby allowing the locking member 41 to be easily switched between the locking state and the unlocking state. More specifically, when the second end 32 of the tensioning belt 3 is pulled to cause the tensioning belt 3 to be tensioned, and when the user operates the second end 412 of the locking member 41 to cause the locking member 41 to be switched to the locking state, the cam of the locking member 41 will press the tensioning belt 3 against the channel wall 4021 of the locking channel 402. At this time, even if the user loosens the second end 32 of the tensioning belt 3, the portion of the tensioning belt 3 between the first end 31 and the locking mechanism 4 remains tensioned. When the user operates the second end 412 of the locking member 41 to cause the locking member 41 to be switched to the unlocking state, the cam of the locking member 41 releases the tensioning belt 3 from being pressed, namely the tensioning belt 3 is not clamped between the cam of the locking member 41 and the channel wall 4021 of the locking channel 402. At this time, the whole tensioning belt 3 is in a relaxed state, and the user may pull the tensioning belt 3 as needed.

Referring to FIG. 3, in some embodiments, an elastic member 6 is arranged between the base 1 and the rebound bracket 2. According to requirement, the elastic member 6 is configured to exert a force on the rebound bracket 2 to keep the rebound bracket 2 away from the base 1 or to make it close to the base 1. Taking the elastic member 6 exerting the force on the rebound bracket 2 to keep the rebound bracket 2 away from the base 1 for example, when the rebound bracket needs to be released from pressing against the backrest, the user switches the locking member 41 to the unlocking state, and the rebound bracket 2, under the action of the elastic member 6, may move up automatically, thus not pressing against the backrest.

In some embodiments, the elastic member 6 includes a second torsion spring. The second torsion spring sleeves the third pin shaft 28, and two ends of the second torsion spring are connected to the base 1 and the rebound bracket 2, respectively. In some embodiments not shown, the elastic member 6 is a linear spring, and two ends of the spring are connected to the base 1 and the rebound bracket 2, respectively.

Referring to FIG. 2, after the supporting assembly 100 of this embodiment is installed on the vehicle seat, when it needs to press against the seat body and the backrest of the vehicle seat tightly, for example, the locking member 41 is switched to the unlocking state, and the second end 32 of the tensioning belt 3 is pulled forwards to force the rebound bracket 2 to pivot in the direction shown by the arrow Z, thus getting the rebound bracket 2 to press tightly against the backrest easily. Then the locking member 41 is switched to the locking state, to keep the rebound bracket 2 pressing against the backrest tightly. In addition, by pushing the load leg 5 backward, the load leg 5 may easily press against the floor of the vehicle tightly.

In the supporting assembly 100 of this embodiment, the load leg 5 is a retractable load leg or a load leg with a fixed length, and the load leg 5 is fixedly or pivotally connected to the base 1. The second end 32 of the tensioning belt 3 is pulled, thus forcing the rebound bracket 2 to press tightly against the backrest easily. Then the tensioning belt 3 is locked by the locking mechanism 4, and the bottom end of the load leg 5 presses against the floor of the vehicle tightly, thus enabling the supporting assembly 100 to reliably engage with a seat of various vehicles.

FIGS. 7 through 10 schematically show the structure of the supporting assembly 100 of the child safety seat according to another embodiment of the present application.

As shown in the figures, similar to the embodiments above, the supporting assembly 100 of this embodiment includes a base 1, a rebound bracket 2, a tensioning belt 3, a locking mechanism 4, and a load leg 5. This embodiment differs from the embodiments above mainly in a position of the locking mechanism 4. If there is no conflict, other features of this embodiment can refer to the description of the embodiments above.

Figure 7:
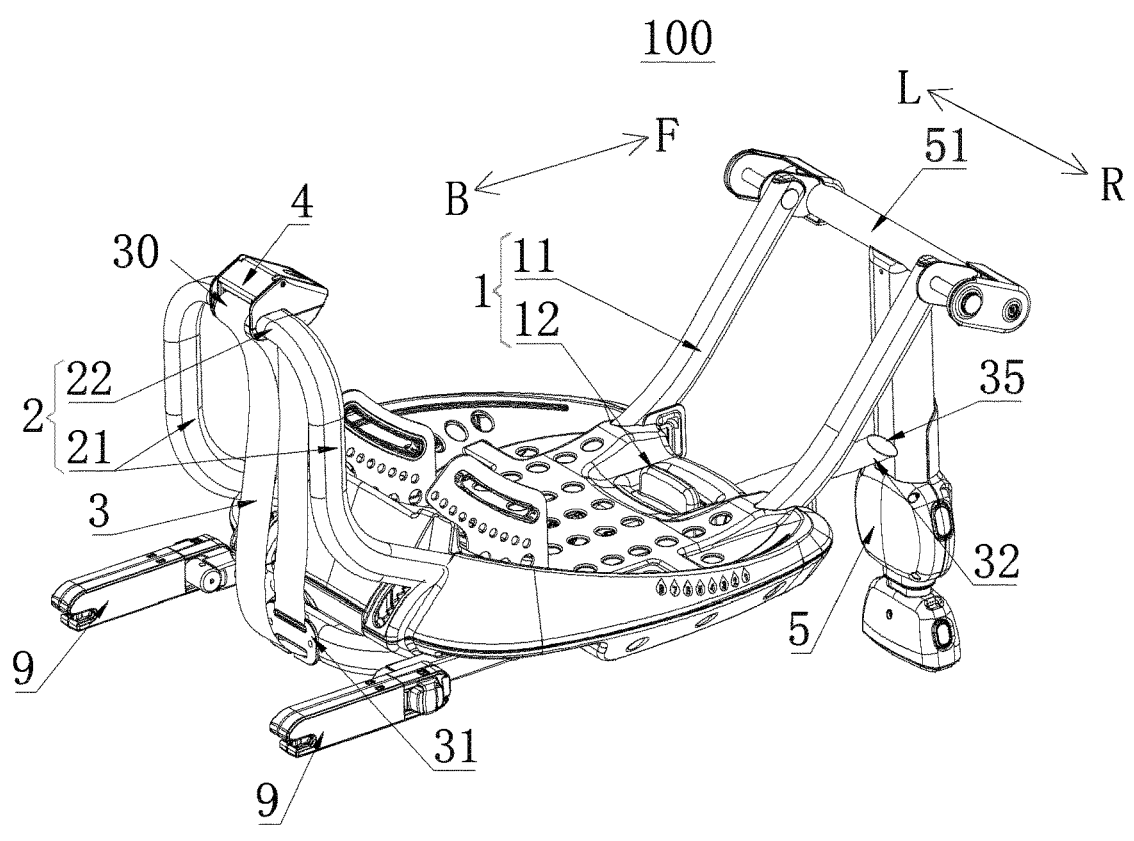
FIG. 7 schematically shows a perspective view of the supporting assembly of the child safety seat according to another embodiment of the present application.
Figure 8:
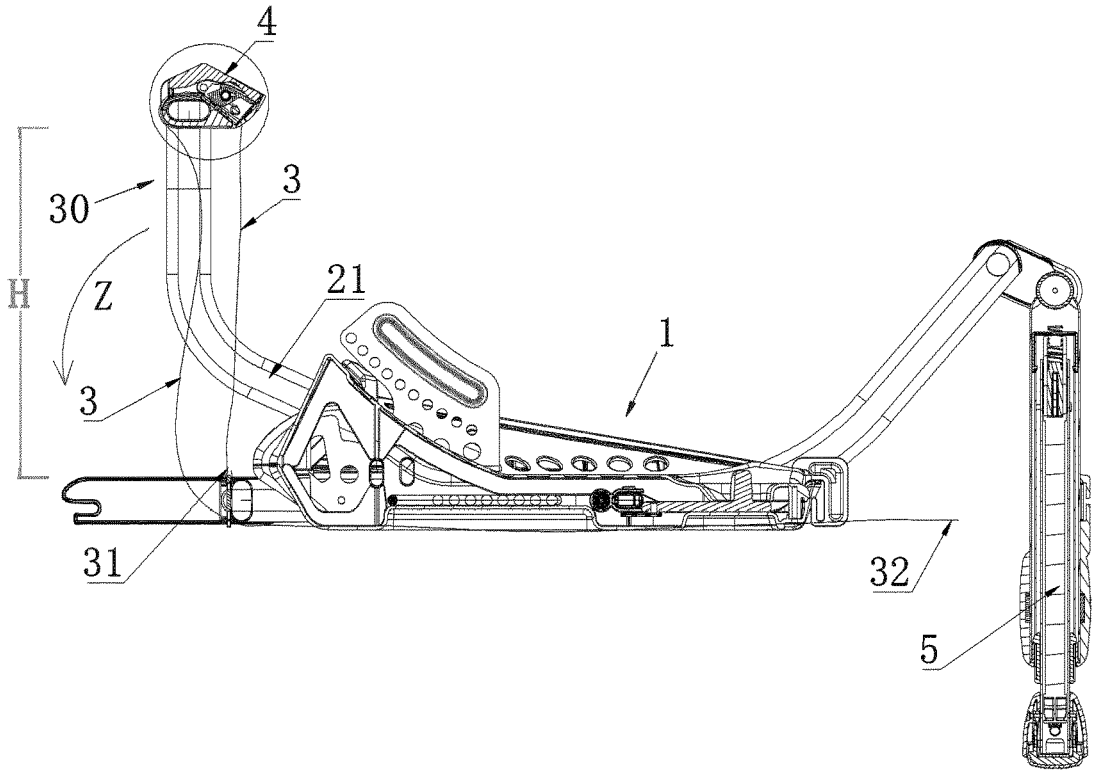
FIG. 8 schematically shows a longitudinal sectional view of the supporting assembly of the child safety seat according to the other embodiment of the present application.
Figure 9:
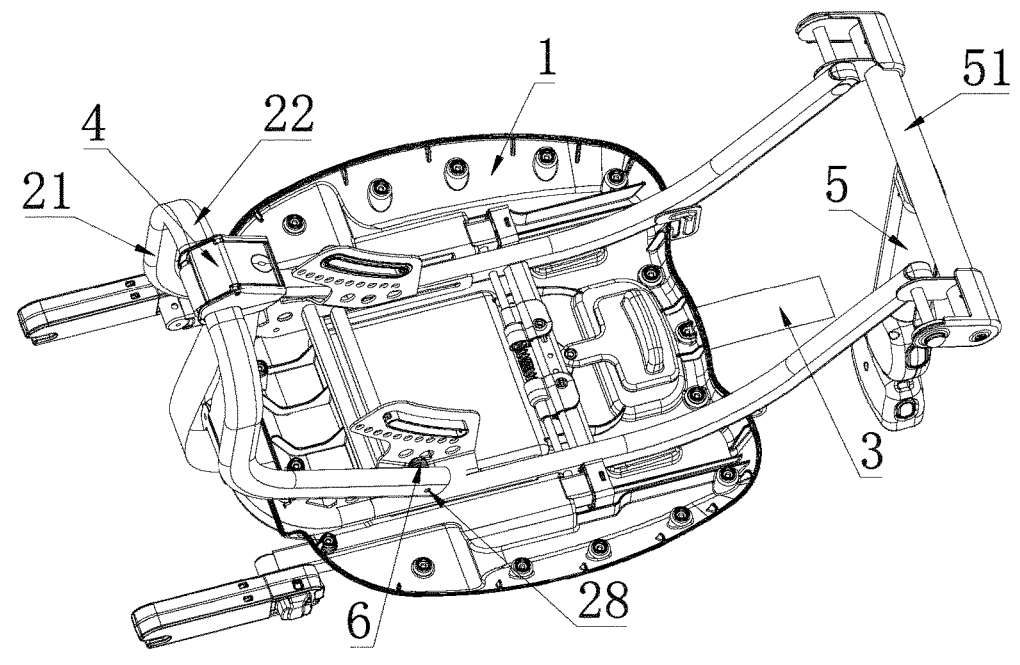
FIG. 9 schematically shows a perspective view of another direction of the supporting assembly of the child safety seat according to the other embodiment of the present application.

Referring to FIGS. 7 through 9, in this embodiment, the locking mechanism 4 is arranged on the middle portion of the first crossbeam 22 instead of on the base body 12 of the base 1, and the middle portion 30 of the tensioning belt 3 is connected with the first crossbeam 22 of the rebound bracket

2 by means of the locking channel 402 of the locking mechanism 4. Referring to FIG. 8, the first end 31 of the tensioning belt 3 is connected to the base 1, and the second end 32 of the tensioning belt 3 passes through the locking mechanism 4 and then goes downwards, and then goes through the bottom of the base 1 and extends towards the front of the base 1.

Figure 10:
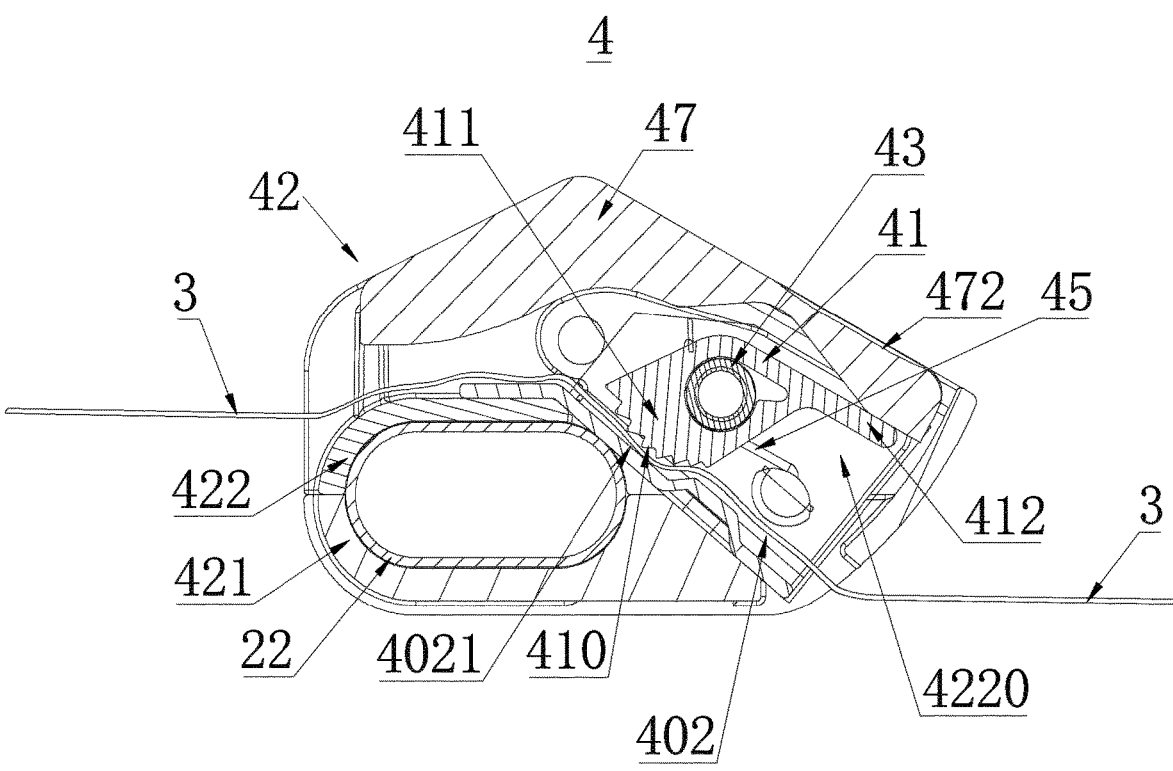
FIG. 10 schematically shows a longitudinal sectional view of the locking mechanism of the supporting assembly of the child safety seat according to the other embodiment of the present application.

The structure of the locking mechanism 4 can refer to the locking mechanism 4 shown in FIG. 6, which will not be described repeatedly herein. Referring to FIGS. 9 and 10, in this embodiment, the first housing 421 and the second housing 422 of the mounting housing 42 are engaged, and fixed to the middle portion of the first crossbeam 22, for example, by a fastener.

Referring to FIG. 8, when the supporting assembly 100 of this embodiment is in use, the second end 32 of the tensioning belt 3 is pulled, such that the tensioning belt 3 is tensioned, and at the same time, apply a pressure to the rebound bracket 2 to enable the rebound bracket 2 to pivot towards the base 1 in the direction shown by the arrow Z, thus pressing against the backrest of the vehicle seat tightly. Then the relative movement between the tensioning belt 3 and the locking mechanism 4 is prevented by the locking mechanism 4, so that the portion of the tensioning belt 3 between the first end 31 and the locking mechanism 4 is kept in a tensioned state. That is, under the action of the tensioning belt 3 and the locking mechanism 4, the vertical distance H between the first crossbeam 22 and the first end 31 of the tensioning belt 3 remains an approximately fixed value. In this case, even if the user loosens the second end 32 of the tensioning belt 3, the tensioning belt 3 may still remain the state of exerting the pressure on the rebound bracket 2, and the rebound bracket 2 is kept pressing tightly against the backrest of the vehicle seat.

Figure 11:
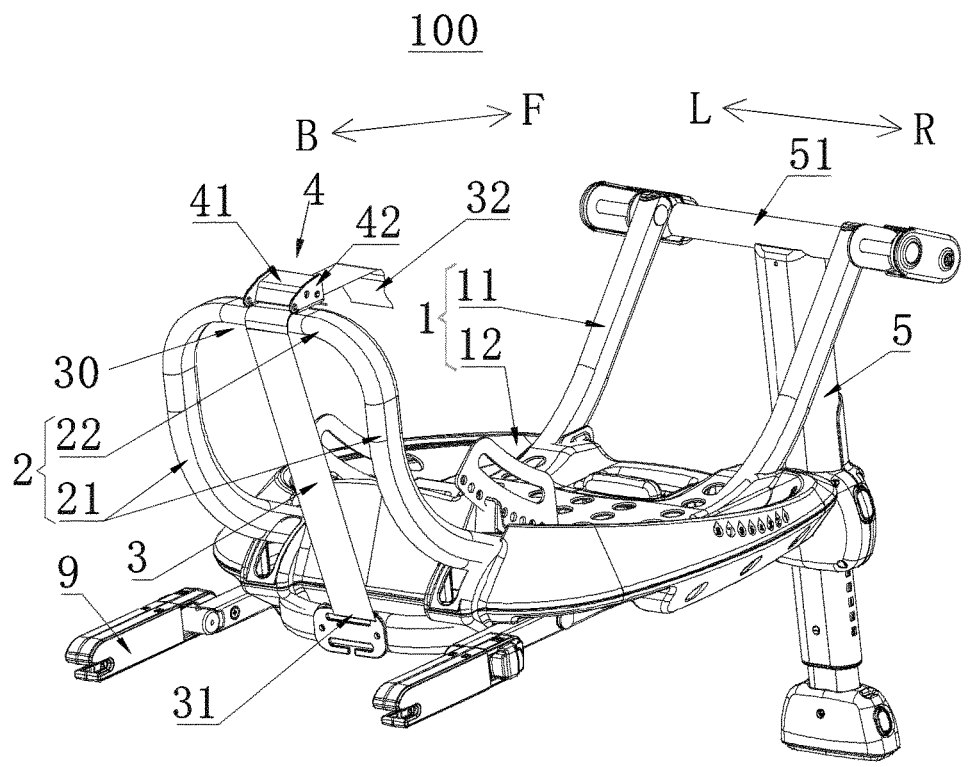
FIG. 11 schematically shows a perspective view of the supporting assembly of the child safety seat according to yet another embodiment of the present application.
Figure 12:
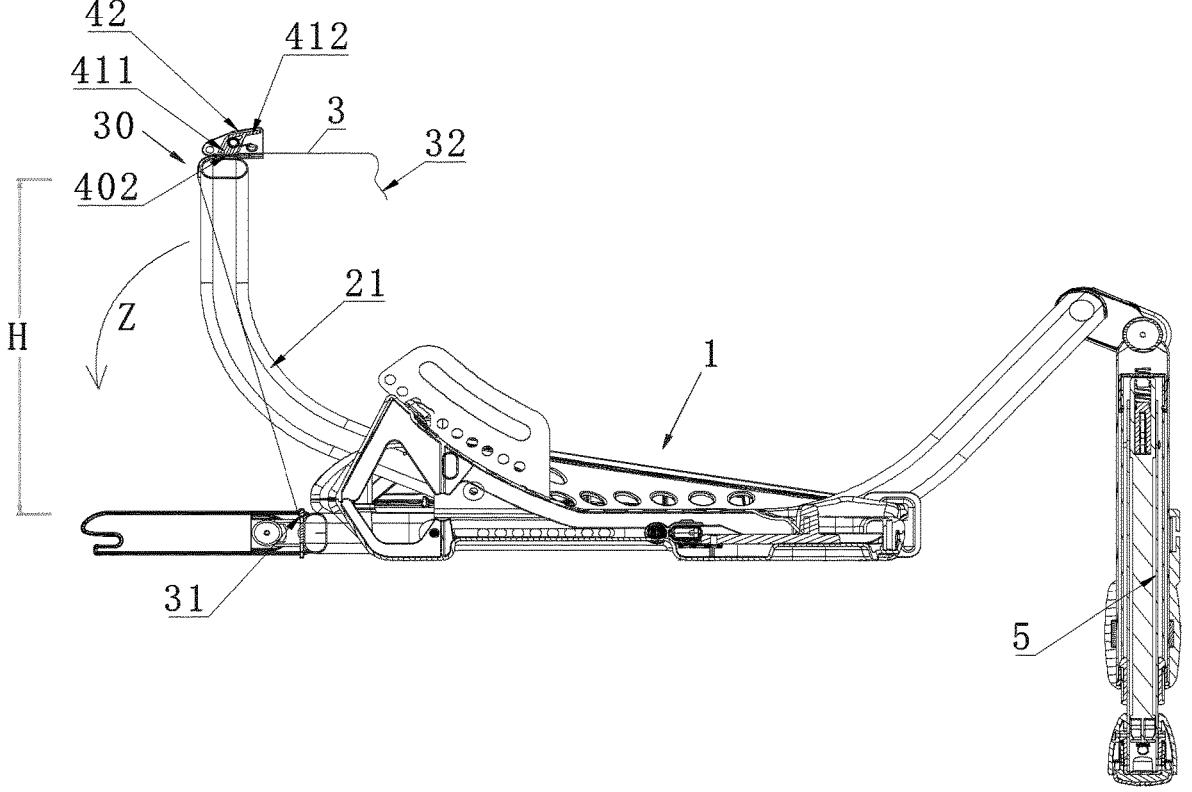
FIG. 12 schematically shows a partial longitudinal sectional view of the supporting assembly of the child safety seat according to the other embodiment of the present application.

FIGS. 11 and 12 schematically show the structure of the supporting assembly 100 of the child safety seat according to yet another embodiment of the present application.

As shown in the figures, similar to the embodiments shown in FIGS. 7 through 9, the supporting assembly 100 of this embodiment includes a base 1, a rebound bracket 2, a tensioning belt 3, a locking mechanism 4, and a load leg 5. The locking mechanism 4 is arranged at the middle portion of the first crossbeam 22. Different from the embodiments shown in FIGS. 7 through 9, in this embodiment, the second end 32 of the tensioning belt 3 is not configured to extend to the front of the base 1 through the bottom of the base 1. Referring to FIG. 11, the second end 32 of the tensioning belt 3 is configured, for example, to pass through the locking mechanism 4 in a direction from the rear to the front thereof. The second end 32 of the tensioning belt 3, when being free of force, hangs above the base 1. Because the tensioning belt 3 does not need to pass through the bottom of the base 1, the length of the tensioning belt 3 is significantly reduced. If there is no conflict, for other features of this embodiment, please refer to the description of the embodiments above.

In addition, the structure of the locking mechanism 4 of this embodiment can refer to the locking mechanism 4 shown in FIG. 6, FIG. 11 or FIG. 12. The locking mechanism 4 includes the mounting housing 42 configured to fix the locking mechanism 4 on the first crossbeam 22 and the locking member 41 pivotally connected to the mounting housing 42. The first end 411 of the locking member 41 functions as a locking end to press against the tensioning belt 3, and the second end 412 of the locking member 41 functions as an operating end to release the first end 411 of the locking member 41 from pressing against the tensioning belt 3. Referring to the description of the embodiments above, the locking member 41 is pivotally connected to the mounting housing 42 by the first pin shaft 43. The first end 411 of the locking member 41 includes, for example, a cam, or the first end 411 of the locking member 41 is a curved surface including protruding teeth 410. The first torsion spring 45 sleeves the first pin shaft 43. In addition, the mounting housing 42 may not be provided with the button 47.

When the supporting assembly 100 of this embodiment is in use, the second end 32 of the tensioning belt 3 is pulled horizontally while the rebound bracket 2 is pushed towards the backrest of the vehicle seat. While the tensioning belt 3 is tensioned, the rebound bracket 2 pivots towards the base 1 in the direction shown by the arrow Z and presses tightly against the backrest of the vehicle seat. Then the relative movement between the tensioning belt 3 and the locking mechanism 4 is prevented by the locking mechanism 4, so that the portion of the tensioning belt 3 between the first end 31 and the locking mechanism 4 is kept in a tensioned state. That is, under the action of the tensioning belt 3 and the locking mechanism 4, the vertical distance H between the first crossbeam 22 and the first end 31 of the tensioning belt 3 remains the approximately fixed value. In this case, even if the user loosens the second end 32 of the tensioning belt 3, the tensioned portion of the tensioning belt 3 may pull the first crossbeam 22 and does not rebound, thus the rebound bracket 2 is kept pressing tightly against the backrest of the vehicle seat.

Figure 13:
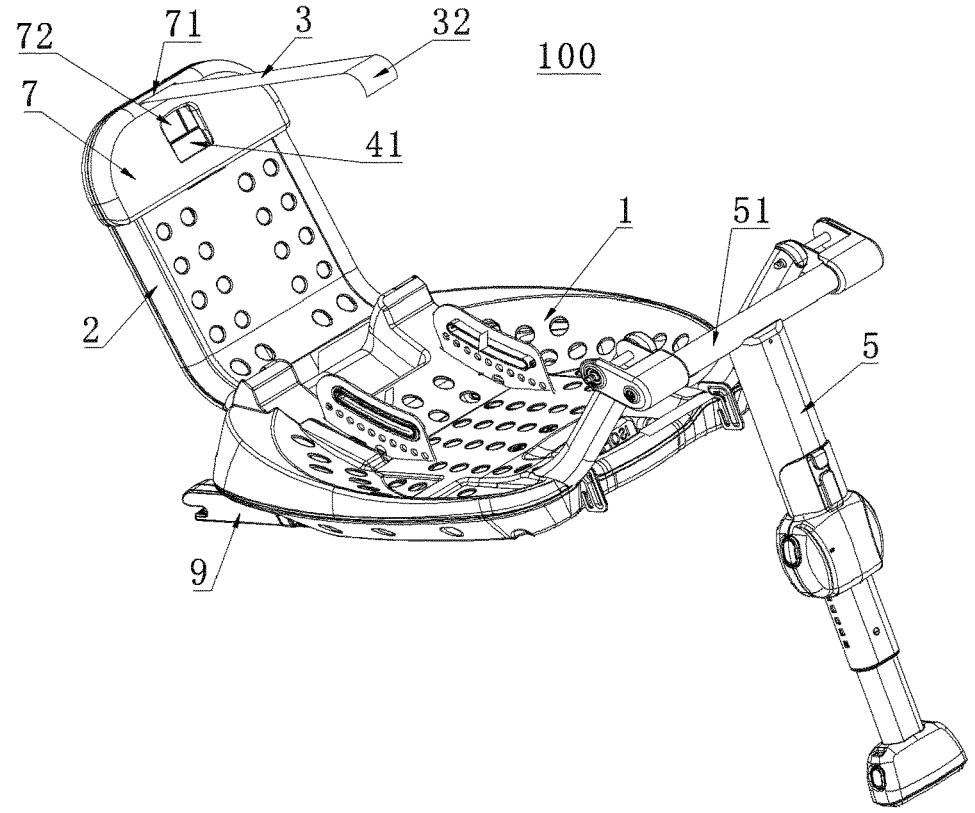
FIG. 13 schematically shows a perspective view of the supporting assembly of the child safety seat according to yet another embodiment of the present application.
Figure 14:
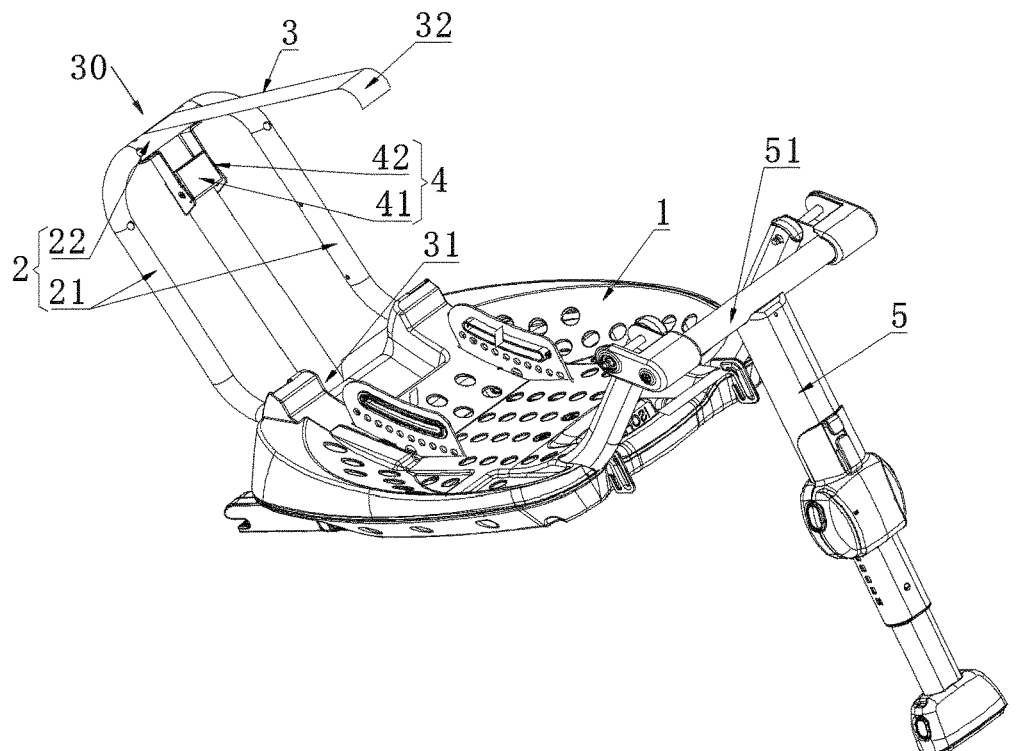
FIG. 14 schematically shows another perspective view of the supporting assembly of the child safety seat according to the other embodiment of the present application.
Figure 15:
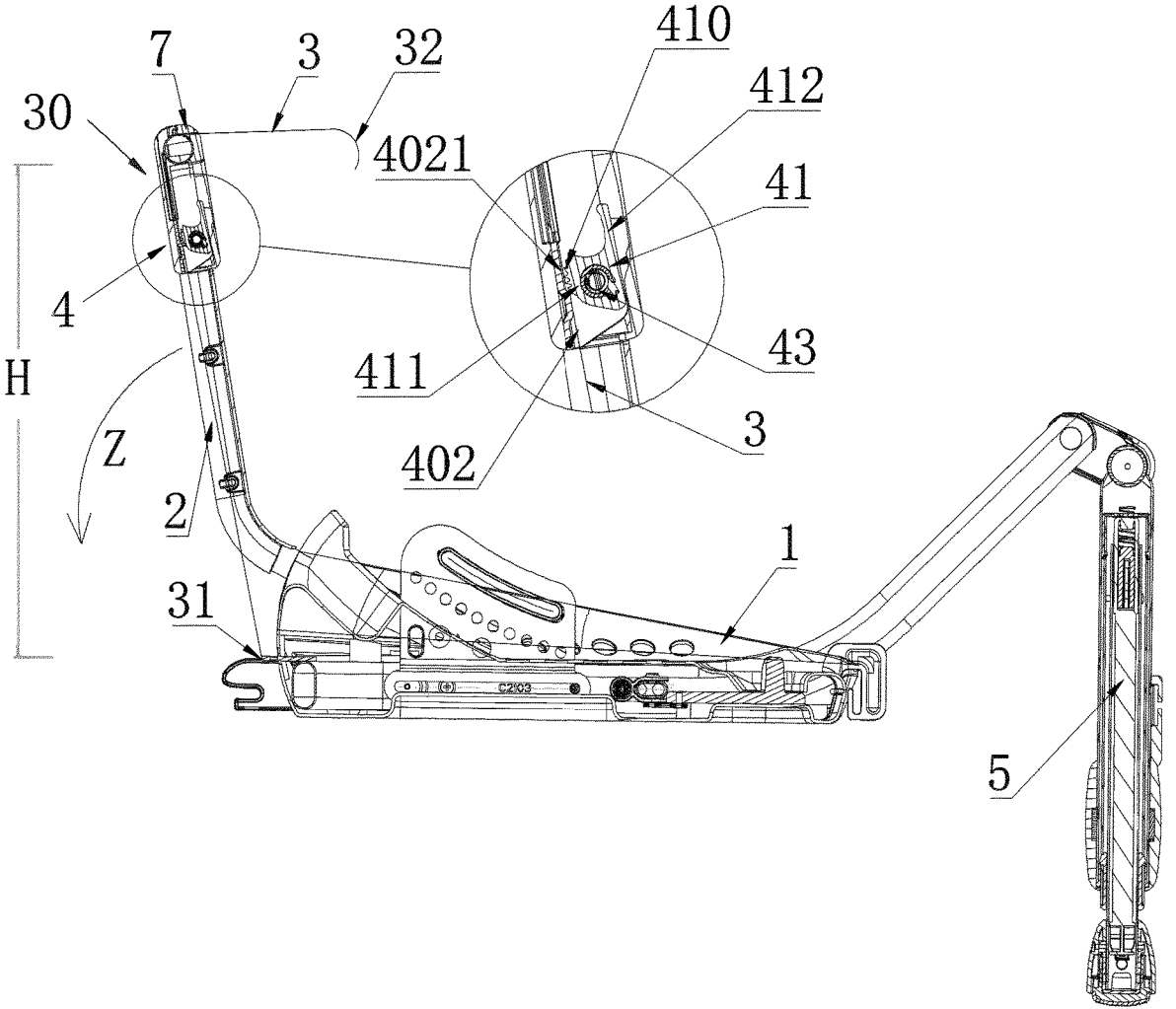
FIG. 15 schematically shows a longitudinal sectional view of the supporting assembly of the child safety seat according to the other embodiment of the present application.

FIGS. 13 through 15 schematically show the structure of the supporting assembly 100 of the child safety seat according to yet another embodiment of the present application.

As shown in the figures, similar to the embodiments shown in FIG. 11 and FIG. 12, the supporting assembly 100 of this embodiment includes a base 1, a rebound bracket 2, a tensioning belt 3, a locking mechanism 4, and a load leg 5. The locking mechanism 4 is connected to the middle portion of the first crossbeam 22. Different from the embodiments shown in FIG. 11 and FIG. 12, the second end 32 of the tensioning belt 3 is configured to pass through the locking channel 402 of the locking mechanism 4 first, then is wrapped around the first crossbeam 22, and then extends forwards. In order to prevent the middle portion 30 of the tensioning belt 3, which is wrapped around the first crossbeam 22, from moving along the first crossbeam 22 unexpectedly, a housing 7 is provided at the first crossbeam 22 of the rebound bracket 2, and the housing 7 has a hole 71 allowing the tensioning belt 3 which is wrapped around the first crossbeam 22 to pass. In addition, if the features do not conflict with each other, for the other features of this embodiment, please refer to the descriptions of the embodiments above.

As shown in FIG. 14 and FIG. 15, the locking mechanism 4 includes the mounting housing 42 configured to fix locking mechanism 4 on the first crossbeam 22, and the locking member 41 pivotally connected to the mounting housing 42 by the first pin shaft 43. A first torsion spring 45 is configured to sleeve the first pin shaft 43, and two ends of the first torsion spring 45 are connected to the locking member 41 and the mounting housing 42, respectively. The first end 411 of the locking member 41 functions as a locking end to press against the tensioning belt 3. The second end 412 of the locking member 41 functions as an operating end, and when being stressed, may overcome the elastic force of the first torsion spring 45 to force the locking member 41 to pivot around the first pin shaft 43, thereby releasing the first end 411 of the locking member 41 from pressing against the tensioning belt 3. The mounting housing 42 may not be provided with the button 47. Referring to FIG. 20) 13, a hole 72 is disposed at a position of the housing 7, which corresponds to a position of the second end 412 of the locking member 41, and the user may operate the second end 412 of the locking member 41 through the hole 72.

It should be noted that, although the middle portion 30 of the tensioning belt 3 of this embodiment is configured to pass through the through hole 71 and be wrapped around the first crossbeam 22, in other embodiments, the middle portion 30 of the tensioning belt 3 is configured to pass through the locking mechanism 4 but not be wrapped around the first crossbeam 22, and the tensioning belt 3 is connected with the first crossbeam 22 by the locking mechanism 4.

When the supporting assembly 100 of this embodiment is in use, the second end 32 of the tensioning belt 3 is pulled while the rebound bracket 2 is pushed towards the backrest of the vehicle seat. The rebound bracket 2 pivots towards the base 1 in the direction shown by the arrow Z, and presses tightly against the backrest of the vehicle seat while the tensioning belt 3 is tensioned. The relative movement between the tensioning belt 3 and the locking mechanism 4 may be prevented by the locking mechanism 4, so that the portion of the tensioning belt 3 between the first end 31 and the locking mechanism 4 is kept in a tensioned state. That is, under the action of the tensioning belt 3 and the locking mechanism 4, the vertical distance H between the first crossbeam 22 and the first end 31 of the tensioning belt 3 remains the approximately fixed value. In this case, even if the user loosens the second end 32 of the tensioning belt 3, the tensioned portion of the tensioning belt 3 may pull the first crossbeam 22 and does not rebound, thus the rebound bracket 2 is kept pressing tightly against the backrest of the vehicle seat.

The embodiment of the present application also provides a child safety seat, and the child safety seat is provided with any one of the supporting assemblies 100 of the child safety seat above.

The technical features of the embodiments above may be combined arbitrarily. For the sake of brevity, not all possible combinations of the technical features of the embodiments above are described. However, as long as there is no contradiction between the combinations of these technical features, all combinations of these technical features should be within the scope described in the description.

The embodiments above are only several embodiments of the present application, and the descriptions of the embodiments are specific and detailed, but should not be construed as a limitation on the scope of the application. It should be noted that for those of ordinary skill in the art, various modifications and improvements may also be made without departing from the concept of the present application, and these modifications and improvements are all within the protection scope of the application. Therefore, the protection scope of the application should be subject to the appended claims.

What is claimed is:

1. A supporting assembly of a child safety seat, comprising:

a base;

a rebound bracket, comprising a pivotable arm, and a first crossbeam disposed at an upper end of the pivotable arm, a lower end of the pivotable arm being pivotally connected to the base;

a locking mechanism, arranged on the base; and a tensioning belt, a first end of the tensioning belt being connected to the base, a second end of the tensioning belt functioning as a pulling end, a middle portion of the tensioning belt being configured to pass through the first crossbeam and the locking mechanism;

wherein, the second end of the tensioning belt is configured to pass through the first crossbeam first, and then the locking mechanism; and the locking mechanism is configured to lock the tensioning belt.

2. The supporting assembly of the child safety seat according to claim 1, wherein the first crossbeam comprises a guiding channel, and the middle portion of the tensioning belt is configured to pass through the guiding channel and be wrapped around the first crossbeam.

3. The supporting assembly of the child safety seat according to claim 2, wherein, an accessory is arranged on the first crossbeam, and the guiding channel is formed in the accessory or formed between the accessory and the first crossbeam.

4. The supporting assembly of the child safety seat according to claim 1, wherein, the locking mechanism is disposed on a front end of the base, and the middle portion of the tensioning belt is configured to pass through the locking mechanism through a bottom of the base.

5. The supporting assembly of the child safety seat according to claim 1, wherein, the locking mechanism comprises a locking channel and a locking member, the middle portion of the tensioning belt is configured to pass through the locking channel, and the locking member is configured to press the tensioning belt against a channel wall of the locking channel.

6. The supporting assembly of the child safety seat according to claim 5, wherein, a first protruding part is arranged on a surface of the locking member, which is in contact with the tensioning belt; and/or, a second protruding part is arranged on a surface of the channel wall, which is in contact with the tensioning belt.

7. The supporting assembly of the child safety seat according to claim 1, wherein, an elastic member is arranged between the base and the rebound bracket, and the elastic member is configured to exert a force on the rebound bracket to keep the rebound bracket away from the base or to keep the rebound bracket close to the base.

8. A supporting assembly of a child safety seat, comprising:

a base;

a rebound bracket, comprising a pivotable arm, and a first crossbeam disposed on an upper end of the pivotable arm, a lower end of the pivotable arm being pivotally connected to the base;

a locking mechanism, arranged on the first crossbeam; and a tensioning belt, a first end of the tensioning belt being connected to the base, a middle portion of the tensioning belt being configured to pass through the locking mechanism, a second end of the tensioning belt functioning as a pulling end;

wherein, the locking mechanism is configured to lock the tensioning belt.

9. The supporting assembly of the child safety seat according to claim 8, wherein the second end of the tensioning belt is configured to pass through a bottom of the base and to extend towards a front of the base.

10. The supporting assembly of the child safety seat according to claim 8, wherein, the locking mechanism comprises a locking channel and a locking member, the middle portion of the tensioning belt is configured to pass through the locking channel, and the locking member is configured to press the tensioning belt against a channel wall of the locking channel.

11. The supporting assembly of the child safety seat according to claim 10, wherein:

the locking mechanism further comprises a mounting housing, and the locking channel is formed in the mounting housing; and the locking member is pivotally connected to the mounting housing by a first pin shaft, a first end of the locking member is configured to press the tensioning belt against the channel wall of the locking channel, a second end of the locking member is configured to bear a force to drive the locking member to rotate around the first pin shaft, to release the tensioning belt from being pressed by the first end of the locking member.

12. The supporting assembly of the child safety seat according to claim 11, wherein the first end of the locking member comprises a cam.

13. The supporting assembly of the child safety seat according to claim 11, wherein the locking mechanism further comprises a first torsion spring sleeving the first pin shaft, and two ends of the first torsion spring are connected to the locking member and the mounting housing, respectively.

14. The supporting assembly of the child safety seat according to claim 11, wherein, the locking mechanism further comprises a button, pivotally connected to the mounting housing by a second pin shaft and at least partially covering the locking member, and the button has a pressing portion corresponding to the second end of the locking member.

15. The supporting assembly of the child safety seat of claim 11, wherein the first end of the locking member has a curved surface configured to press against the tensioning belt.

16. The supporting assembly of the child safety seat according to claim 15, wherein a ratchet structure is disposed on the curved surface.

17. The supporting assembly of the child safety seat according to claim 8, wherein an elastic member is arranged between the base and the rebound bracket, and the elastic member is configured to exert a force on the rebound bracket to keep the rebound bracket away from the base or to keep the rebound bracket close to the base.

18. The supporting assembly of the child safety seat according to claim 17, wherein:

the elastic member is a spring, and two ends of the spring are connected to the base and the rebound bracket, respectively; or the elastic member is a second torsion spring, a lower end of the rebound bracket is pivotally connected to the base by a third pin shaft, the second torsion spring sleeves the third pin shaft, and two ends of the second torsion spring are connected to the base and the rebound bracket, respectively.

19. A child safety seat, provided with the supporting assembly of the child safety seat according to claim 1.

20. The supporting assembly of the child safety seat of claim 8, wherein the first end of the tensioning belt is fixedly connected to the base and the second end of the tensioning belt is a free end.

* * * * *